April 28, 1925.

J. HOPKINSON

WEIGHING SCALE

Filed Oct. 26, 1920

1,535,416

INVENTOR
Joseph Hopkinson
BY
ATTORNEYS

Patented Apr. 28, 1925.

1,535,416

UNITED STATES PATENT OFFICE.

JOSEPH HOPKINSON, OF DAYTON, OHIO, ASSIGNOR TO INTERNATIONAL SCALE COMPANY, OF DAYTON, OHIO, A CORPORATION OF ILLINOIS.

WEIGHING SCALE.

Application filed October 26, 1920. Serial No. 419,636.

*To all whom it may concern:*

Be it known that I, JOSEPH HOPKINSON, a citizen of the United States of America, residing at Dayton, in the county of Montgomery and State of Ohio, have invented certain new and useful Improvements in Weighing Scales, of which the following is a full, clear, and exact description.

This invention relates to improvements in weighing scales and more particularly to the connection between the main scale beam and the pivotal weight indicator. In scales of the class known as portable scales it has been the general practice to use a fulcrumed main beam with an upstanding arm projecting upwardly therefrom at a point adjacent the fulcrum of the beam. To this arm there has been coupled a rack which meshed with a pinion on the indicator shaft. Such constructions, while satisfactory in many respects, have necessitated the taking of extreme care in the design and construction of the main scale beam bearings. With the old construction slight shifts in the location of the beam pivot in the bearing would be communicated directly in magnified form (due to the leverage of the upstanding arm) to the indicator pinion. Therefore, the bearing had to be made with the utmost care with a narrow sharp angled pointed V so as to keep the pivot absolutely in place. Also the pivots were necessarily very sharp and wore comparatively rapidly thereby imparting inaccuracies to the dial reading.

The present invention has for its object the provision of a connection which will minimize, if not entirely obviate, the difficulties previously encountered.

Further objects and advantages will be more fully pointed out in the appended claims.

In the drawings

Figure 1:
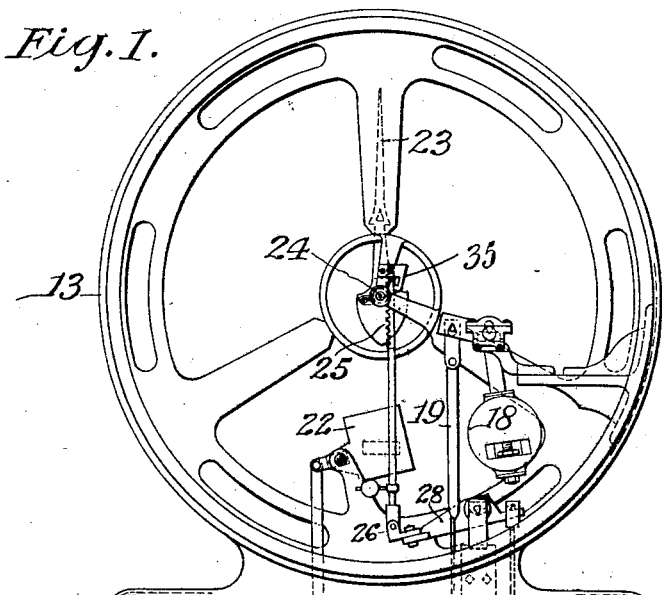
Fig. 1 shows a rear elevation view of a scale embodying my improved construction.
Figure 2:
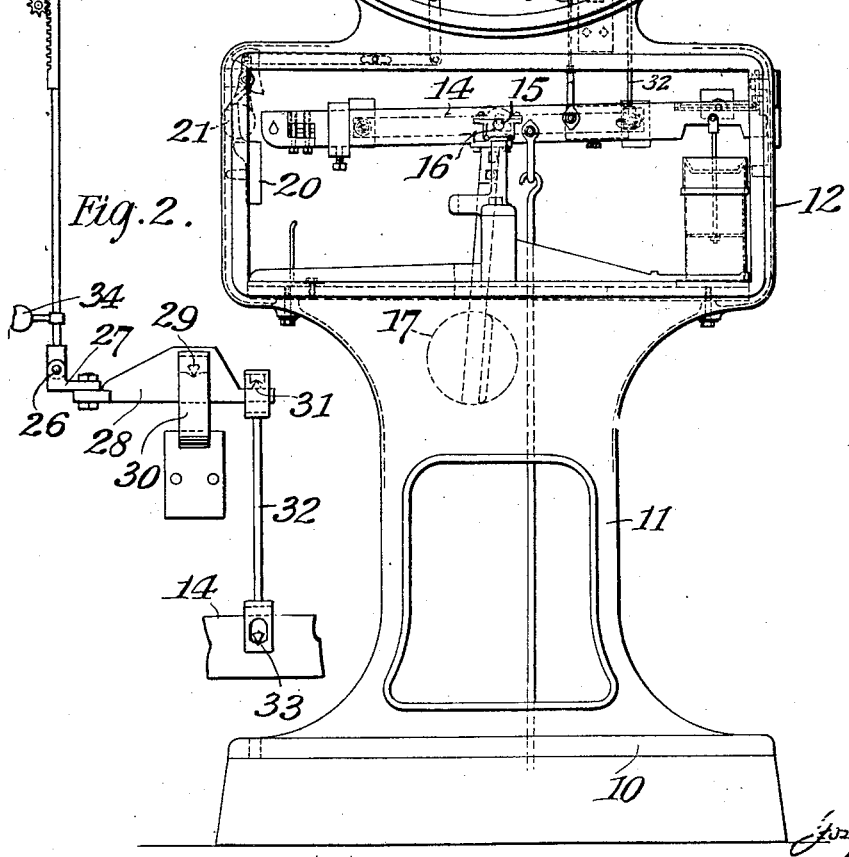
Fig. 2 shows a detail view of the indicating connection between the scale beam and pinion.

The scale which is of the type generally known to the trade as a portable scale, comprises a platform 10, a pedestal 11, a lever housing 12, and dial housing 13. Within the lever housing is a lever or scale beam 14. This beam carries a knife edge 15 which rests upon suitable bearings 16 and forms a fulcrum for the beam.

The load is automatically counterbalanced by pendulums 17 and 18, the former being fixed to and depending from the beam and the latter being mounted above the beam and connected thereto by a link 19. When the capacity of the automatic counterbalance is exceeded a capacity weight 20 may be deposited upon the beam by manipulating a lever 21. The amount of this weight is indicated upon an indicator 22 which moves over a window in the dial. The indicating device comprises a pointer 23 sweeping over the usual dial, and mounted upon an arbor carrying a pinion 24. This pinion meshes with a vertical rack 25. The rack at its lower end carries a pin 26 which connects with an adjustable nose piece 27. The nose piece is carried by an intermediate lever 28 which is fulcrumed on one end of knife edges 29 in bearings carried by bracket 30. The opposite end of the lever 28 is provided with an upwardly facing knife edge 31 which cooperates with a bearing carried by a link 32. The lower end of this link is provided with a similar bearing which cooperates with a knife edge 33 carried by the scale beam.

In order to insure the rack meshing with the pinion I provide a weight arm 34. This weight arm at all times keeps the rack in mesh with its pinion with a light yielding pressure.

Should shock or vibration tend to unmesh the rack and pinion a guide block 35 normally slightly spaced from the rear face of the rack will contact therewith and prevent excessive lateral displacement of the rack.

Upon the application of a load to the scale platform the main beam is tilted about its fulcrum thereby rocking the intermediate lever and elevating the rack. The knife edge connections minimize the friction.

The construction described is of such character that slight lateral shifting movements of the main beam in its bearings do not become magnified at the indicating pointer. Therefore it becomes possible to provide fulcrum bearings with comparatively wider V notches and with a slightly rounded bottom thereto. This rounding of the bottom of the bearings is not sufficient in extent to show on the drawings but it materially decreases the difficulty and cost of manufacturing the bearings and makes for ease of assembly, sealing and testing of the scale as a whole and greatly improves the durability of the scale when in service.

What I claim is—

1. In a weighing scale, in combination, a fulcrumed main scale beam, automatic counterbalancing means connected thereto, a pivotal indicator, a pinion therefor, a vertical rack meshing with the pinion, an intermediate lever having a direct connection with said rack and a direct link connection with said main scale beam, said intermediate lever and its connection to the rack and beam being independent of the automatic counterbalance and its connection to said beam.

2. In a weighing scale, in combination, a fulcrumed main scale beam, a pivotal indicator having a pinion, a vertical rack enmeshing therewith, an intermediate lever fulcrumed above said beam, connections between said lever and said rack and beam respectively, and a pendulum counterbalancing means also connected to the beam independently of the aforesaid connections between the beam and intermediate lever and between the lever and rack.

3. In a weighing scale having a fulcrumed main beam and pendulum counterbalancing means therefor, comprising a lower depending pendulum, and an upper pendulum connected by a link to said beam, a pivotal indicator and means for driving the same comprising a vertical rack and a pinion, an intermediate lever connected to said rack, and a link connecting said lever and the main beam for the purpose described.

In testimony whereof I hereto affix my signature.

JOSEPH HOPKINSON.